(12) United States Patent
Karczewicz et al.

(10) Patent No.: US 9,338,456 B2
(45) Date of Patent: May 10, 2016

(54) CODING SYNTAX ELEMENTS USING VLC CODEWORDS

(75) Inventors: Marta Karczewicz, San Diego, CA (US); Liwei Guo, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 712 days.

(21) Appl. No.: 13/545,478

(22) Filed: Jul. 10, 2012

(65) Prior Publication Data

US 2013/0114734 A1   May 9, 2013

Related U.S. Application Data

(60) Provisional application No. 61/506,542, filed on Jul. 11, 2011, provisional application No. 61/552,367, filed on Oct. 27, 2011.

(51) Int. Cl.
*H04N 19/91* (2014.01)

(52) U.S. Cl.
CPC ......... *H04N 19/00951* (2013.01); *H04N 19/91* (2014.11)

(58) Field of Classification Search
None
See application file for complete search history.

(56) References Cited

U.S. PATENT DOCUMENTS

| | | | |
|---|---|---|---|
| 5,227,878 A | 7/1993 | Puri et al. | |
| 5,253,055 A | 10/1993 | Civanlar et al. | |
| 5,600,812 A | 2/1997 | Park | |
| 5,701,164 A | 12/1997 | Kato | |
| 5,821,887 A | 10/1998 | Zhu | |
| 5,831,557 A * | 11/1998 | Handley | ............. 341/67 |
| 5,999,111 A | 12/1999 | Park et al. | |
| 6,014,095 A | 1/2000 | Yokoyama | |

(Continued)

FOREIGN PATENT DOCUMENTS

| | | | |
|---|---|---|---|
| EP | 1424856 A1 | 6/2004 |
| EP | 1553779 A1 | 7/2005 |

(Continued)

OTHER PUBLICATIONS

Database Inspect [Online] The Institution of Electrical Engineers, Stevenage, GB; 2007, Lin et al: "An efficient table-merging method for variable length coding." Database accession No. 9856393 ; & 2007 IEEE International Conference on Electron Devices and Solid-State Circuits—EDSSC '07 Dec. 20-22, 2007 Tainan, Taiwan, pp. 1179-1182, 2007 IEEE.*

(Continued)

*Primary Examiner* — William C Vaughn, Jr.
*Assistant Examiner* — Stuart Bennett
(74) *Attorney, Agent, or Firm* — Shumaker & Sieffert, P.A.

(57) ABSTRACT

This disclosure describes techniques for coding transform coefficients for a block of video data. According to these techniques, a video coder (a video encoder or video decoder) stores a first VLC table array selection table in memory, and an indication of at least one difference between the first VLC table array selection table and a second VLC table array selection table. The video coder reconstructs at least one entry of the second VLC table array selection table based on the first VLC table array selection table using the stored indication of the difference between the first VLC table array selection table and a second VLC table array selection table. The video coder uses the reconstructed at least one entry of the second VLC table array selection table to code at least one block of video data.

19 Claims, 5 Drawing Sheets

(56) References Cited

U.S. PATENT DOCUMENTS

| | | | |
|---|---|---|---|
| 6,219,457 B1 | 4/2001 | Potu | |
| 6,243,421 B1 | 6/2001 | Nakajima et al. | |
| 6,646,578 B1 | 11/2003 | Au | |
| 6,696,993 B2 | 2/2004 | Karczewicz | |
| 6,771,193 B2 | 8/2004 | Craft | |
| 6,795,584 B2 | 9/2004 | Karczewicz et al. | |
| 7,394,942 B2 | 7/2008 | Chen et al. | |
| 7,680,349 B2 | 3/2010 | Chen et al. | |
| 7,702,013 B2 | 4/2010 | Schwarz et al. | |
| 7,800,520 B2 | 9/2010 | Lin et al. | |
| 7,843,998 B2 | 11/2010 | Bjontegaard | |
| 7,920,629 B2 | 4/2011 | Bjontegaard et al. | |
| 8,350,735 B2 * | 1/2013 | Hallapuro et al. | 341/67 |
| 8,401,082 B2 | 3/2013 | Ye et al. | |
| 8,446,301 B2 | 5/2013 | He et al. | |
| 8,502,709 B2 * | 8/2013 | Jia | H03M 7/40 341/50 |
| 2003/0081850 A1 | 5/2003 | Karczewicz et al. | |
| 2004/0021592 A1 | 2/2004 | Karczewicz | |
| 2004/0233076 A1 | 11/2004 | Zhou | |
| 2004/0234144 A1 | 11/2004 | Sugimoto et al. | |
| 2006/0146936 A1 | 7/2006 | Srinivasan | |
| 2007/0036223 A1 | 2/2007 | Srinivasan | |
| 2007/0064937 A1 | 3/2007 | Van Leest et al. | |
| 2007/0139236 A1 | 6/2007 | Shastry et al. | |
| 2007/0200737 A1 | 8/2007 | Gao et al. | |
| 2008/0002767 A1 | 1/2008 | Schwarz et al. | |
| 2008/0013633 A1 | 1/2008 | Ye et al. | |
| 2008/0063083 A1 | 3/2008 | Kondo et al. | |
| 2008/0089422 A1 | 4/2008 | Karczewicz | |
| 2008/0089424 A1 | 4/2008 | Karczewicz et al. | |
| 2008/0130507 A1 | 6/2008 | Kwon | |
| 2008/0130512 A1 | 6/2008 | Park et al. | |
| 2008/0165036 A1 | 7/2008 | Shima | |
| 2008/0165858 A1 | 7/2008 | Karczewicz et al. | |
| 2008/0209180 A1 | 8/2008 | Lee | |
| 2008/0253443 A1 | 10/2008 | Mittal et al. | |
| 2008/0310504 A1 | 12/2008 | Ye et al. | |
| 2008/0310745 A1 | 12/2008 | Ye et al. | |
| 2009/0016440 A1 | 1/2009 | Tian et al. | |
| 2009/0086815 A1 | 4/2009 | Tian et al. | |
| 2009/0110070 A1 | 4/2009 | Takahashi et al. | |
| 2009/0154820 A1 | 6/2009 | Li et al. | |
| 2009/0161974 A1 | 6/2009 | Bjontegaard et al. | |
| 2009/0226103 A1 | 9/2009 | Choi et al. | |
| 2009/0228601 A1 | 9/2009 | Tseng et al. | |
| 2009/0232204 A1 | 9/2009 | Lee et al. | |
| 2010/0020867 A1 | 1/2010 | Wiegand et al. | |
| 2010/0046626 A1 | 2/2010 | Tu et al. | |
| 2010/0135384 A1 | 6/2010 | Berkvens et al. | |
| 2010/0150226 A1 | 6/2010 | Hallapuro et al. | |
| 2010/0290533 A1 | 11/2010 | Minagawa | |
| 2011/0169670 A1 | 7/2011 | Gou et al. | |
| 2011/0182361 A1 * | 7/2011 | Nakamura et al. | 375/240.16 |
| 2011/0206135 A1 | 8/2011 | Drugeon et al. | |
| 2011/0211636 A1 | 9/2011 | Yamada et al. | |
| 2011/0280314 A1 | 11/2011 | Sankaran et al. | |
| 2012/0020408 A1 | 1/2012 | Chen et al. | |
| 2012/0082230 A1 | 4/2012 | Karczewicz et al. | |
| 2012/0163471 A1 | 6/2012 | Karczewicz et al. | |
| 2012/0170662 A1 | 7/2012 | Karczewicz et al. | |
| 2012/0224628 A1 | 9/2012 | Seo et al. | |
| 2012/0236931 A1 | 9/2012 | Karczewicz et al. | |
| 2013/0010860 A1 | 1/2013 | Tian et al. | |
| 2013/0089138 A1 | 4/2013 | Guo et al. | |
| 2013/0114669 A1 | 5/2013 | Karczewicz et al. | |

FOREIGN PATENT DOCUMENTS

| | | |
|---|---|---|
| EP | 1679903 A2 | 7/2006 |
| EP | 2182732 A1 | 5/2010 |
| JP | 2000134495 A | 5/2000 |
| JP | 2008048098 A | 2/2008 |
| TW | 201028010 A | 7/2010 |
| WO | WO9800807 A1 | 1/1998 |
| WO | 9836574 A1 | 8/1998 |
| WO | WO03027940 A1 | 4/2003 |
| WO | WO03063501 A1 | 7/2003 |
| WO | WO03084076 A1 | 10/2003 |
| WO | WO2007063472 A2 | 6/2007 |
| WO | WO2008008714 A1 | 1/2008 |
| WO | WO2010022023 A1 | 2/2010 |

OTHER PUBLICATIONS

Bjontegaard et al., "Context-Adaptive VLC (CVLC) Coding of Coefficients," JVT-CO28, 3$^{rd}$ meeting: Fairfax, VA, May 6-10, 2002, 8 pp.

Bross et al., "High efficiency video coding (HEVC) text specification draft 6" Document JCTVC-H1003, 7th Meeting: Geneva, CH, Nov. 21-30, 2011, 259 pp.

Bross et al., "High efficiency video coding (HEVC) text specification draft 7," 9th Meeting: Geneva, CH, Apr. 27-May 7, 2012, JCTVC-I11003_d21, 290 pp.

Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, 261 pp.

Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross et al., "WD5: Working Draft 5 of High-Efficiency Video Coding," JCTVC-G1103_d2,7th Meeting, Geneva, Switzerland (Nov. 2011), 214 pp.

ITU-T H.264, Series H: Audiovisual and Multimedia Systems, Infrastructure of audiovisual services—Coding of moving video, Advanced video coding for generic audiovisual services, Mar. 2010, 669 pp.

ITU-T H.264, Series H: Audiovisual and Multimedia Systems, Infrastructure of audiovisual services—Coding of moving video, Advanced video coding for generic audiovisual services, Jun. 2011, 674 pp.

Karczewicz et al., "Video coding technology proposal by Qualcomm Inc.," JCTVC-A121, 1$^{st}$ meeting, Dresden, DE, Apr. 15-23, 2010, 24 pp.

Karczewicz et al., "CE5: coefficient coding with LCEC for large block", 5th Meeting; Geneva,CH, JCTVC-E383, Mar. 16-23, 2011, 3 pp.

Karczewicz et al., "Improvements on VLC", Joint Collaborative Team on Video Coding of ISO/IEC JTC1 /SC29/W11 and ITU-T SG 16, No. JCTVC-C263, 3$^{rd}$ meeting: Guangzhou, CN, Oct. 7-15, 2010, 5 pp.

Ugur et al., "High Performance, Low Complexity Video Coding and the Emerging Hevc Standard", IEEE Transactions on Circuits and Systems for Video Technology, vol. 20, No. 12, Dec. 2010, pp. 1688-1697.

Lee et al., "Efficient coefficient coding method for large transform in VLC mode", 3rd Meeting; Guangzhou, CN, JCTVC-C210, Oct. 7-15, 2010, 6 pp.

Wang et al., "Context-Based 2D-VLC Entropy Coder in AVS Video Coding Standard", Journal of Computer Science and Technology, vol. 21, No. 3, May 2006, pp. 315-322.

Schwarz et al., "Overview of the Scalable Video Coding Extension of the H.264/AVC Standard", IEEE Transactions on Circuits and Systems for Video Technology, Sep. 2007, pp. 1103-1120, vol. 17, No. 9.

Wiegand et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Ugur et al., "Description of video coding technology proposal by Tandberg, Nokia, Ericsson", Joint Collaborative Team on Video Coding (JCT-VC) of ITU-T SG16 WP3 and ISO/IEC JTC1/SC29/WG11 1st Meeting, No. JCTVC-A119, Apr. 15-23, 2010, 33 pp.

Ugur et al., "Appendix to Description of video coding technology proposal by Tandberg, Nokia, Ericsson", Joint Collaborative Team on Video Coding (JCT-VC) of ITU-T SG16 WP3 and ISO/IEC JTC1 /SC29/ W11 1st Meeting, Dresden DE, JCTVC-A119, Apr. 15-23, 2010, 55 pp.

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011,193 pp.

Wiegand et al., "WD2: Working Draft 2 of High-Efficiency Video Coding," JCTVC-D503, Jan. 20-28, 2011, 153 pp.

Yi et al., "Low-Complexity Tools in AVS Part 7", Journal of Computer Science and Technology, May 2006, pp. 345-353, vol. 21, No. 3.

ITU-T H.265, Series H: Audiovisual and Multimedia Systems, Infrastructure of audiovisual services—Coding of moving video, High efficiency video coding, The International Telecommunication Union, Apr. 2013, 317 pages.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Chen et al "Comments on Generalized P and B Pictures", JCT-VC Meeting; MPEG Meeting; Jan. 20-28, 2011; Daegu, KR; (Joint Collaborative Team on Video Coding of ITU-T SG.16 WP3 and ISO/IEC JTCI/SC29/WG11) ; URL: http://wftp3.itu.int/av-arch/jctvc-site/, No. JCTVC-D401, XP030008440, ISSN: 0000-0013, 4 pp.

International Search Report and Written Opinion—PCT/US2012/046218—ISA/EPO—Apr. 17, 2013, 8 pp.

Karczewicz et al., "CE5: Improved coefficient coding with LCEC", Document: JCTVC-D374, 4th Meeting: Daegu, KR, Jan. 20-28, 2011, 3 pp.

Kim, et al., "Memory-Efficient H.264/AVC CAVLC for Fast Decoding", IEEE Transactions on Consumer Electronics, vol. 52, No. 3, Aug. 2006, pp. 943-952, XP002694517, IEEE USA, ISSN: 0098-3063, 10 pp.

Lin, et al., "An Efficient Table-Merging Method for Variable Length Coding", 2007 IEEE International Conference on Electron Devices and Solid-State Circuits—EDSSC '07, 2007, pp. 1179-1182, XP002694516, IEEE Piscataway, NJ, USA ISBN: 978-1-4244-0636-4, 4 pp.

International Preliminary Report on Patentability from International Application No. PCT/US2012/046218, dated Jul. 11, 2011, 5 pp.

"Test Model under Consideration," Joint Collaborative Team on Video Coding (JCT-VC) of ITU-T SG16 WP3 and ISO/IEC JTC1/SC29/WG11, Document: JCTVC-B205, Status: Output Document (draft000), Jul. 2010, Internet<URL:http://phenix.int-evry.fr/jct/doc_end_user/documents/20_Geneva/wg11/JCTVC-B205.zip>, 152 pp.

Ugur et al., "Description of video coding technology proposal by Tandberg, Nokia, and Ericsson," JCT-VC Meeting; Apr. 15-23, 2010; Dresden, DE; (Joint Collaborative Team on Video Coding of ITU-T SG16 WP3 and ISO/IEC JTC1/SC29/WG11); URL: http://wftp3.1tu.int/av-arch/jctvc-site/, No. XP030007562, XP030007563, 33 pp.

* cited by examiner

VLC Table Array Selection Tables

| Coefficient Number → | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| First Table (g_auiVlcTable8x8Intra) | 8 | 0 | 0 | 0 | 0 | 1 | 5 | 5 | 5 | 5 | 5 | 5 | 5 | 5 |
| Second Table (g_auiVlcTable16x16Intra) | 8 | 0 | 0 | 0 | 0 | 1 | 5 | 5 | 5 | 5 | 5 | 5 | 5 | 5 |

VLC Table Array Selection Tables (cont)

| Coefficient Number → | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|
| First Table (g_auiVlcTable8x8Intra) | 5 | 5 | 5 | 5 | 1 | 1 | 1 | 1 | 1 | 1 | 1 | 1 | 1 | 1 | 1 |
| Second Table (g_auiVlcTable16x16Intra) | 5 | 5 | 5 | 5 | 1 | 1 | 1 | 1 | 1 | 1 | 1 | 1 | 1 | 1 | 2 |

First Table = Second Table + (0,0,0,0,0,0,0,0,0,0,0,0,0,0,0,0,0,0,0,0,0,0,0,0,0,0,0,0,1)

FIG. 4

CODING SYNTAX ELEMENTS USING VLC CODEWORDS

This application claims priority to the following U.S. Provisional Applications, the entire contents each of which is incorporated herein by reference:

U.S. Provisional Application Ser. No. 61/506,542 filed Jul. 11, 2011; and

U.S. Provisional Application Ser. No. 61/552,367, filed Oct. 27, 2011.

TECHNICAL FIELD

This disclosure relates to video coding and compression. More specifically, this disclosure is directed to techniques using variable length coding (VLC) to encode transform coefficients for one or more blocks of video data.

BACKGROUND

Entropy encoding is a method widely employed in video coding to compress video data. In an example entropy encoding method, the video encoder scans a two-dimensional matrix of quantized transform coefficients that represent pixels of an image, to generate a one-dimensional vector of the transform coefficients. A video decoder decodes the video data. As part of the decoding process, the video decoder scans the one-dimensional vector of transform coefficients, to reconstruct the two-dimensional matrix of transform coefficients.

SUMMARY

The details of one or more examples are set forth in the accompanying drawings and the description below. Other features, objects, and advantages of the invention will be apparent from the description and drawings, and from the claims.

Examples include a method of coding a block of video data in which a first VLC table array selection table and an indication of at least one difference between the first VLC table array selection table and a second VLC table array selection table are stored in memory, and at least one entry of the second VLC table array selection table is reconstructed based on the first VLC table array selection table using the stored indication of the difference between the first VLC table array selection table and a second VLC table array selection table. The reconstructed at least one entry of the second VLC table array selection table is used to code at least one block of video data.

In another example, a processor is configured to code at least one block of video data by storing a first VLC table array selection table and an indication of at least one difference between the first VLC table array selection table and a second VLC table array selection table in memory, and reconstruct at least one entry of the second VLC table array selection table based on the first VLC table array selection table using the stored indication of the difference between the first VLC table array selection table and a second VLC table array selection table. The reconstructed at least one entry of the second VLC table array selection table is used to code at least one block of video data.

Another embodiment includes a processor of a computing device, or specifically an encoder or decoder, can be used to perform the method of the above example or other techniques disclosed herein. Other embodiments include computer readable media storing instructions for causing a processor to perform such methods.

BRIEF DESCRIPTION OF DRAWINGS

FIG. 4 is two tables illustrating a method of a video encoding and decoding according to the techniques of this disclosure.

DETAILED DESCRIPTION

Figure 1:
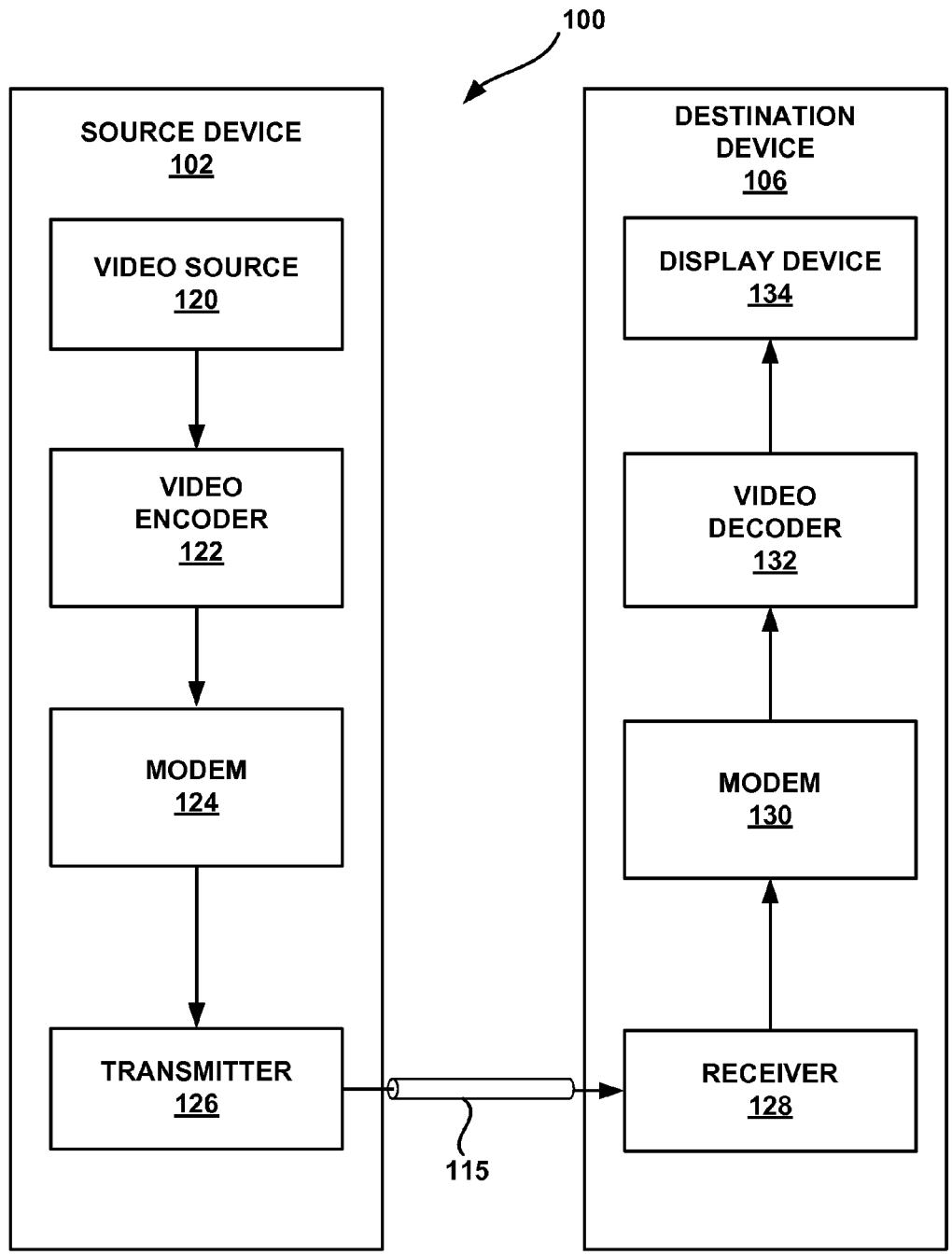
FIG. 1 is a block diagram that illustrates one example of a video encoding and decoding system configured to operate according to the techniques of this disclosure.

In general, this disclosure describes techniques for coding video data. More specifically, the techniques described herein are directed to reducing an amount of memory used by a coder to store VLC table array selection tables that can be used to perform entropy coding of syntax elements.

In typical applications, encoded video data includes prediction data and residual data. In such instances, a video encoder produces the prediction data using an intra-prediction mode or an inter-prediction mode. Intra-prediction generally involves predicting a block of a picture relative to neighboring, previously coded blocks of the same picture. Inter-prediction generally involves predicting a block of a picture relative to data of a previously coded picture.

Following intra- or inter-prediction, a video encoder calculates a residual value for the block. The residual value generally corresponds to the difference between the predicted data for the block and the true value of the block. To further compress the residual value of a block, the residual value is transformed into a set of transform coefficients that compacts as much data (also referred to as "energy") as possible into as few coefficients as possible. The transform coefficients correspond to a two-dimensional matrix of coefficients that is the same size as the original block. In other words, there are just as many transform coefficients as pixels in the original block. However, due to the transform, many of the transform coefficients typically have values equal to zero.

The video encoder often quantizes the transform coefficients to further compress the video data to reduce the amount of data needed to represent the quantized transform coefficients. Following quantization, the video encoder scans the transform coefficients, producing a one-dimensional vector from the two-dimensional matrix including the quantized transform coefficients. The video encoder optionally sets certain coefficients equal to zero prior to or following the scan.

The video encoder entropy encodes the resulting array, to even further compress the data. In some examples, the video encoder is configured to use variable length codes (VLCs) to represent various possible quantized transform coefficients of the array, e.g., using context-adaptive variable-length coding (CAVLC). In other examples, the video encoder is configured to use binary arithmetic coding to encode the resulting quantized coefficients, e.g., using context-adaptive binary arithmetic coding (CABAC). In other examples, the video encoder is configured to use Probability Interval Partitioning Entropy Codes (PIPE) to encode the resulting quantized coefficients.

This disclosure describes techniques related to scanning transform coefficients during a video coding process. The techniques are applicable to both video encoding and decoding units, including video encoder/decoders (CODECs) and processing units configured to perform video encoding and/or decoding. References to "video coding units" or "video coding devices" should be understood to refer to units or devices capable of encoding, decoding, or both encoding and decoding video data.

The techniques described are directed to video coding, specifically reducing an amount of memory used by a coder to store VLC table array selection tables. Terms such as "code", "coder", "coding", "coded", etc. as used herein refer to aspects of the invention applicable to encoding and/or decoding.

FIG. 1 is a block diagram illustrating an exemplary video encoding and a decoding system 100 that can be configured to implement techniques of this disclosure. As shown in FIG. 1, the system 100 includes a source device 102 that transmits encoded video to a destination device 106 via a communication channel 115. The source device 102 and the destination device 106 comprise any of a wide range of devices. In some cases, the source device 102 and the destination device 106 comprise wireless communication device handsets, such as so-called cellular or satellite radiotelephones. The techniques of this disclosure, however, which apply generally to the encoding and decoding transform coefficients of video data, are not necessarily limited to wireless applications or settings, and are potentially applicable to a wide variety of non-wireless devices that include video encoding and/or decoding capabilities.

In the example of FIG. 1, the source device 102 includes a video source 120, a video encoder 122, a modulator/demodulator (modem) 124 and a transmitter 126. The destination device 106 includes a receiver 128, a modem 130, a video decoder 132, and a display device 134. In accordance with this disclosure, the video encoder 122 of the source device 102 scans transform coefficients of a block of video data that includes a two-dimensional matrix of transform coefficients (e.g., that each corresponds to pixels of a displayed image) into a one-dimensional vector that represents the transform coefficients. According to some embodiments of this disclosure, the video encoder 122 adaptively scans a first plurality of the coefficients of the block of video data, and uses a fixed scan for a second plurality of coefficients of the block. For example, for the first plurality of transform coefficients, the video encoder 122 adaptively modifies an order in which the first plurality of transform coefficients are scanned, relative to an order in which transform coefficients of at least one previously encoded block of video data were scanned. For example, the video encoder 122 modifies the order in which transform coefficients are scanned, based on a how often coefficients at the same position in other previously encoded blocks are non-zero coefficients. For the second plurality of transform coefficients, the video encoder 122 does not adaptively modify an order in which the second plurality of transform coefficients are scanned, relative to a scan order of at least one previously encoded block of video data. Instead, the video encoder 122 scans the second plurality of coefficients using a same scan order, for a plurality of blocks of video data encoded by the encoder.

The video decoder 132 of the destination device 106 can also be configured to perform reciprocal transform coefficient decoding. Under those circumstances, the video decoder 132 maps coefficients of a one-dimensional vector of transform coefficients that represent a block of video data to positions within a two-dimensional matrix of transform coefficients, to reconstruct the two-dimensional matrix of transform coefficients.

The illustrated system 100 of FIG. 1 is merely exemplary. The transform coefficient encoding and decoding techniques of this disclosure can be performed by any encoding or decoding devices. The source device 102 and the destination device 106 are merely examples of coding devices that can support such techniques.

In this example, the video encoder 122 of the source device 102 encodes video data received from the video source 120. The video source 120 comprises a video capture device, such as a video camera, a video archive containing previously captured video, or a video feed from a video content provider. As a further alternative, the video source 120 optionally generates computer graphics-based data as the source video, or a combination of live video, archived video, and computer-generated video. In some cases, if the video source 120 is a video camera, the source device 102 and the destination device 106 form so-called camera phones or video phones. In each case, the captured, pre-captured or computer-generated video is encoded by the video encoder 122.

In the exemplary system 100, once the video data is encoded by the video encoder 122, the encoded video information is modulated by the modem 124 according to a communication standard, e.g., such as code division multiple access (CDMA) or any other communication standard or technique, and transmitted to the destination device 106 via the transmitter 126. The modem 124 includes various mixers, filters, amplifiers or other components designed for signal modulation. The transmitter 126 of this example includes circuits designed for transmitting data, including amplifiers, filters, and one or more antennas. The receiver 128 of the destination device 106 receives information over the channel 115, and the modem 130 demodulates the information. Again, the video decoding process performed by the video decoder 132 includes similar (e.g., reciprocal) decoding techniques to the encoding techniques performed by the video encoder 122.

According so some aspects of this disclosure, the communication channel 115 comprises any wireless or wired communication medium, such as a radio frequency (RF) spectrum or one or more physical transmission lines, or any combination of wireless and wired media. In such instances the communication channel 115 forms part of a packet-based network, such as a local area network, a wide-area network, or a global network such as the Internet. The communication channel 115 generally represents any suitable communication medium, or a collection of different communication media, for transmitting video data from the source device 102 to destination device 106.

Again, FIG. 1 is merely exemplary and the techniques of this disclosure are applicable to video coding settings (e.g., video encoding or video decoding) that do not necessarily include any data communication between the encoding and decoding devices. In other examples, data could be retrieved from a local memory, streamed over a network, or the like. An encoding device encodes and store data to memory, and/or a decoding device retrieves and decodes data from memory. In many cases the encoding and decoding is performed by unrelated devices that don't communicate with one another, but simply encode data to memory and/or retrieve and decode data from memory.

Although not shown in FIG. 1, in some aspects, the video encoder 122 and the video decoder 132 could each be integrated with an audio encoder and decoder, and optionally include appropriate MUX-DEMUX units, or other hardware and software, to handle encoding of both audio and video in a common data stream or separate data streams. If applicable, MUX-DEMUX units could conform to the ITU H.223 multiplexer protocol, or other protocols such as the user datagram protocol (UDP).

Either or both of the video encoder 122 and the video decoder 132 can be implemented as one or more microprocessors, digital signal processors (DSPs), application specific integrated circuits (ASICs), field programmable gate arrays (FPGAs), discrete logic, software, hardware, firmware or any combinations thereof. Each of the video encoder 122 and the video decoder 132 is potentially included in one or more encoders or decoders, either of which is potentially integrated as part of a combined encoder/decoder (CODEC) in a respective mobile device, subscriber device, broadcast device, server, or the like.

In some cases, the devices 102, 106 can be configured to operate in a substantially symmetrical manner. For example, each of the devices 102, 106 optionally includes video encoding and decoding components. Hence, the system 100 could support one-way or two-way video transmission between the video devices 102, 106, e.g., for video streaming, video playback, video broadcasting, or video telephony.

During the encoding process, the video encoder 122 executes a number of coding techniques or operations. In general, the video encoder 122 operates on video blocks within individual video frames (or other independently coded units such as slices) in order to encode the video blocks. Frames, slices, portions of frames, groups of pictures, or other data structures can be defined as independent data units that include a plurality of video blocks, and syntax elements can be included at such different independent data units. The video blocks within independent data units can have fixed or varying sizes, and possibly differ in size according to a specified coding standard. In some cases, each video frame includes a series of independently decodable slices, and each slice can additionally include one or more macroblocks or LCUs.

Referring again to FIG. 1, the video encoder 122 often performs predictive coding in which a video block being coded is compared to another block of video data in order to identify a predictive block. This process of predictive coding is often referred to as motion estimation and motion compensation. Motion estimation estimates video block motion relative to one or more predictive video blocks of one or more predictive frames (or other coding units). Motion compensation generates the desired predictive video block from the one or more predictive frames or other coding units. Motion compensation includes an interpolation process in which interpolation filtering is performed to generate predictive data at fractional pixel precision.

After generating the predictive block, the differences between the current video block being coded and the predictive block are coded as a residual block, and prediction syntax (such as a motion vector) is used to identify the predictive block. The residual block is transformed and quantized. Transform techniques optionally comprises a DCT process or conceptually similar process, integer transforms, wavelet transforms, or other types of transforms. In a DCT or DCT-like process, as an example, the transform process converts a set of pixel values (e.g., residual values) into transform coefficients, which for instance represent the energy of the pixel values in the frequency domain. Quantization is typically applied on the transform coefficients, and generally involves a process that limits the number of bits associated with any given transform coefficient.

In many embodiments, following transform and quantization, entropy coding is performed on the transformed and quantized residual video blocks. Syntax elements, various filter syntax information, and prediction vectors defined during the encoding are included in the entropy-coded bitstream. In general, entropy coding comprises one or more processes that collectively compress a sequence of quantized transform coefficients and/or other syntax information. Scanning techniques, such as fixed or adaptive scan orders, are performed on the quantized transform coefficients in order to define one or more serialized one-dimensional vectors of coefficients from two-dimensional video blocks. For example, according to the techniques described herein, both fixed and adaptive scan techniques can be used, for different coefficients of a video block. Once scanned to generate the one or more serialized one-dimensional vectors, the scanned coefficients are then entropy coded along with any syntax information.

As part of the encoding process, encoded video blocks are decoded to generate the video data used for subsequent prediction-based coding of subsequent video blocks. At this stage, filtering can be employed in order to improve video quality, and e.g., remove blockiness or other artifacts from decoded video. This filtering is optionally in-loop or post loop. With in-loop filtering, the filtering of reconstructed video data occurs in the coding loop, which means that the filtered data is stored by an encoder or a decoder for subsequent use in the prediction of subsequent image data. In contrast, with post-loop filtering, the filtering of reconstructed video data occurs out of the coding loop, which means that unfiltered versions of the data are stored by an encoder or a decoder for subsequent use in the prediction of subsequent image data.

Figure 2:
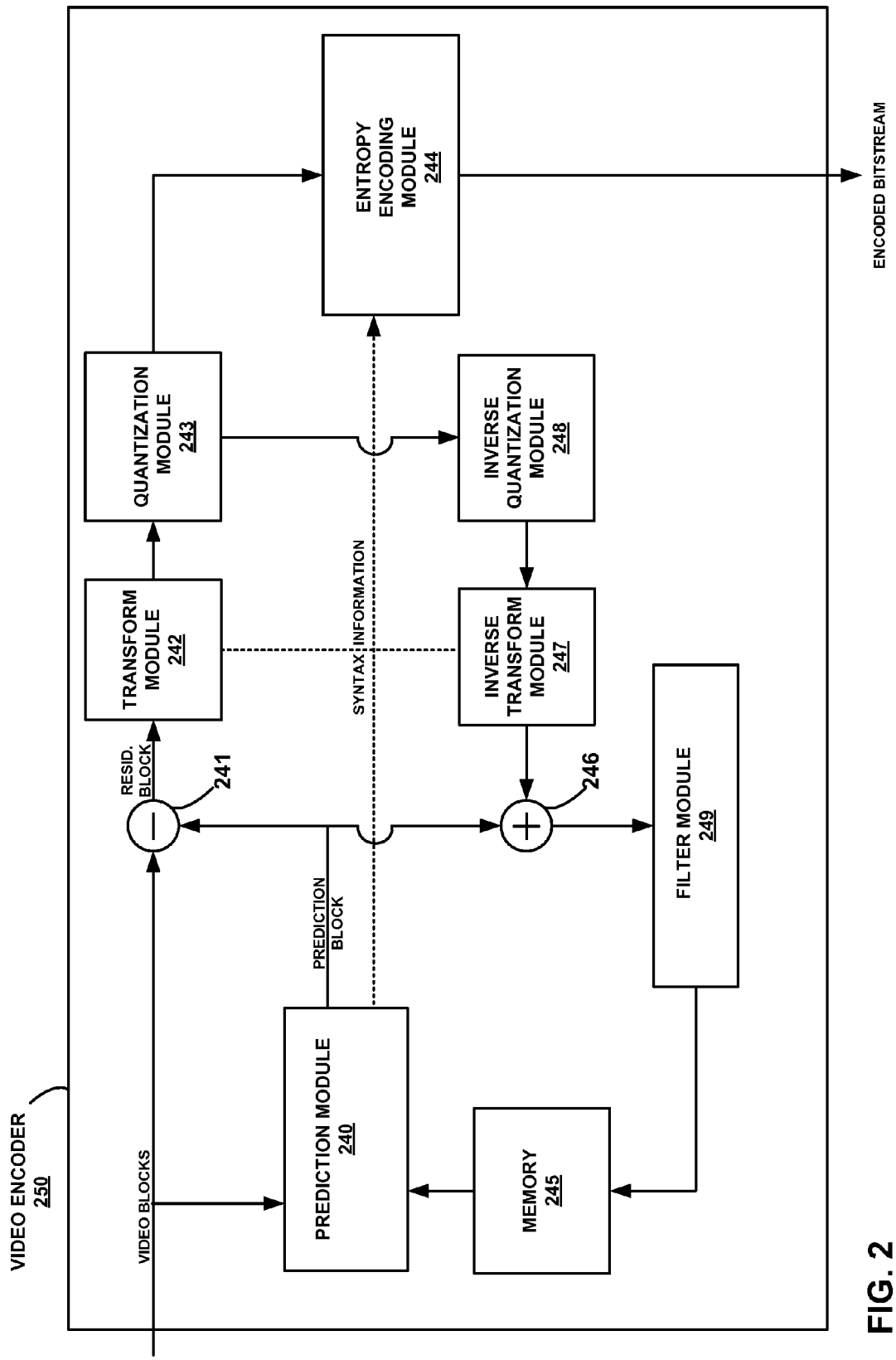
FIG. 2 is a block diagram that illustrates one example of a video encoder configured to operate according to the techniques of this disclosure.

FIG. 2 is a block diagram illustrating an example video encoder 250 consistent with this disclosure. The video encoder 250 could either correspond to the video encoder 122 of the source device 102, or a video encoder of a different device. As shown in FIG. 2, the video encoder 250 includes a prediction module 240, adders 241 and 246, and a memory 245. The video encoder 250 also includes a transform module 242 and a quantization module 243, as well as an inverse quantization module 248 and an inverse transform module 247. The video encoder 250 also includes an entropy coding module 244. The entropy coding module 244 includes a scan module 260.

During the encoding process, the video encoder 250 receives a video block to be coded, and the prediction module 240 performs predictive coding techniques. For inter coding, the prediction module 240 compares the video block to be encoded to various blocks in one or more video reference frames or slices in order to define a predictive block. For intra coding, the prediction module 240 generates a predictive block based on neighboring data within the same frame, slice, or other unit of video data. The prediction module 240 outputs the prediction block and the adder 241 subtracts the prediction block from the video block being coded in order to generate a residual block.

According to some aspects of this disclosure, for inter coding, the prediction module 240 comprises motion estimation and motion compensation modules (not depicted in FIG. 2) that identify a motion vector that points to a prediction block and generates the prediction block based on the motion vector. Typically, motion estimation is considered the process of generating the motion vector, which estimates motion. For example, the motion vector could indicate the displacement of a predictive block within a predictive frame relative to the current block being coded within the current frame. Motion compensation is typically considered the process of fetching or generating the predictive block based on the motion vector determined by motion estimation. For intra coding, the prediction module 240 generates a predictive block based on neighboring data within the same frame, slice, or other unit of video data. One or more intra-prediction modes could potentially define how an intra prediction block can be defined.

In some examples, motion compensation for inter-coding includes interpolations to sub-pixel resolution. Interpolated predictive data generated by the prediction module 240, for example, is interpolated to half-pixel resolution, quarter-pixel resolution, or even finer resolution. This permits motion estimation to estimate motion of video blocks to such sub pixel resolution.

After the prediction module 240 outputs the prediction block, and after the adder 241 subtracts the prediction block from the video block being coded in order to generate a residual block, the transform module 242 applies a transform to the residual block. The transform optionally comprises a discrete cosine transform (DCT), an integer transform, or a conceptually similar transform such as that defined by the ITU H.264 standard, the HVEC standard, or the like. In some examples, the transform module 242 performs differently sized transforms and selects different sizes of transforms for coding efficiency and improved compression. Wavelet transforms, integer transforms, sub-band transforms or other types of transforms could also be used. In any case, the transform module 242 applies a particular transform to the residual block of residual pixel values, producing a block of residual transform coefficients. The transform converts the residual pixel value information from a pixel domain to a frequency domain.

The inverse quantization module 248 and the inverse transform module 247 apply inverse quantization and inverse transform, respectively, to reconstruct the residual block in the pixel domain. The summer 246 adds the reconstructed residual block to the prediction block produced by the prediction module 240 to produce a reconstructed video block for storage in the memory 245. The filter module 249 possibly performs in-loop or post loop filtering on reconstructed video blocks.

In some examples, the memory 245 stores a frame or slice of blocks for use in motion estimation with respect to blocks of other frames to be encoded. Prior to such storage, in the case of in-loop filtering, the filter module 249 applies filtering to the video block to improve video quality. Such filtering by the filter module 249 reduces blockiness or other artifacts. Moreover, filtering improves compression by generating predictive video blocks that comprise close matches to video blocks being coded. Filtering can also be performed post-loop such that the filtered data is output as decoded data, but unfiltered data is used by the prediction module 240.

In certain examples, the quantization module 243 quantizes the residual transform coefficients (e.g., from the transform module 242) to further reduce bit rate. The quantization module 243, for example, limits the number of bits used to code each of the coefficients. After quantization, the entropy encoding module 244 scans and entropy encodes the data. For example, the entropy encoding module 244 could scan the quantized coefficient block from a two-dimensional representation to generate one or more serialized one-dimensional vectors. For example, the scan module 260 could perform a scan of a two-dimensional matrix that represents a quantized coefficient block.

Following this scanning process, the entropy encoding module 244 encodes the quantized transform coefficients (along with any syntax elements) according to an entropy coding methodology as described herein to further compress the data. In this example, syntax information included in the entropy encoded bitstream includes prediction syntax from the prediction module 240, such as motion vectors for inter coding or prediction modes for intra coding. Syntax information included in the entropy encoded bitstream possibly also includes filter information, such as that applied for interpolations by the prediction module 240 or filters applied by the filter module 249. In addition, syntax information included in the entropy coded bitstream can also includes one or more VLC code words that represent one or more of syntax elements (or other information).

Following the entropy coding by the entropy encoding module 244, the encoded video is transmitted to another device or archived for later transmission or retrieval. For example, a decoder could use a one-dimensional vector of transform coefficients of the encoded video, generated by entropy the encoding module 244, to reconstruct a two-dimensional matrix that represents a block of video data.

Figure 3:
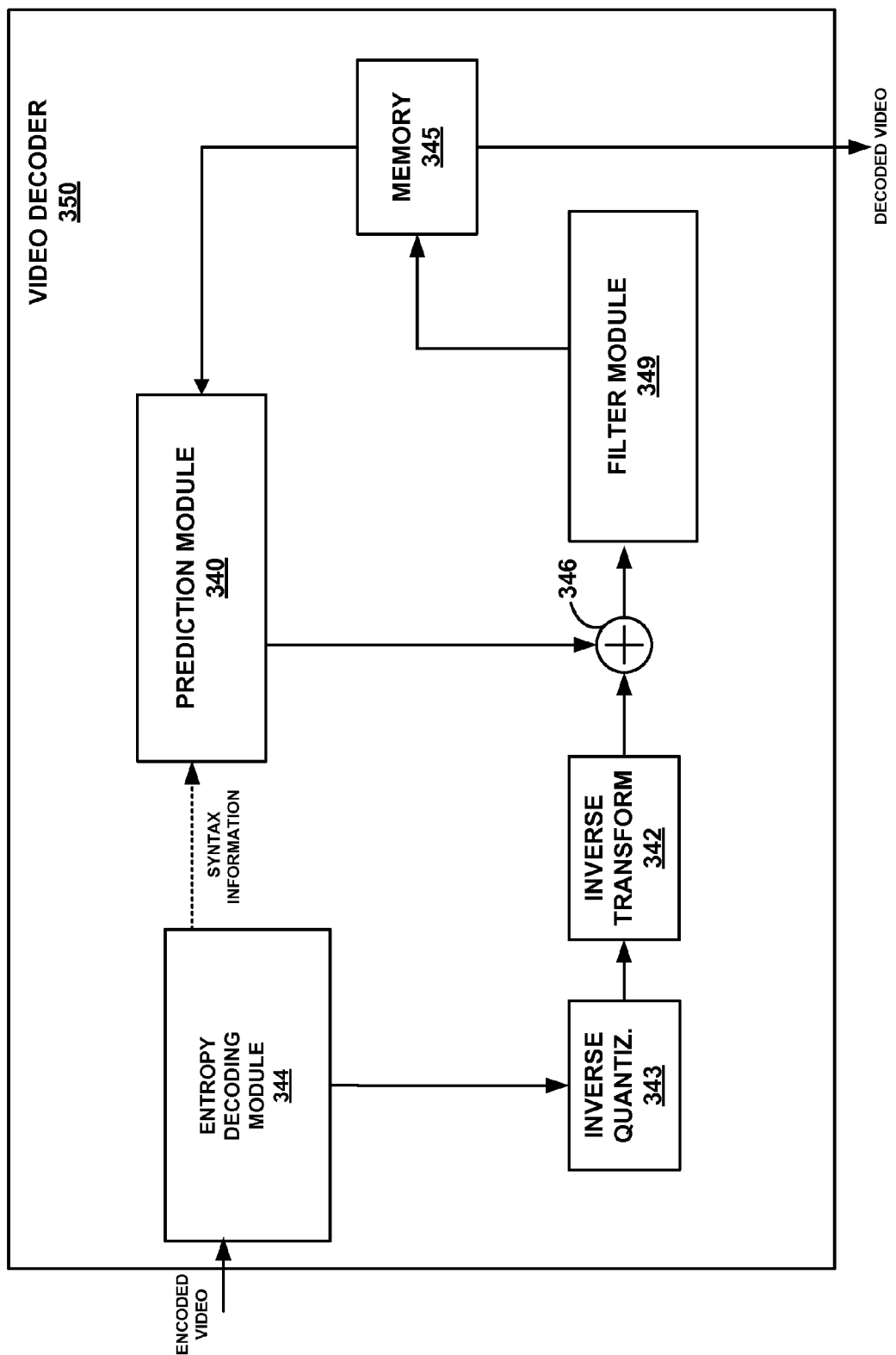
FIG. 3 is a block diagram that illustrates one example of a video decoder configured to operate according to the techniques of this disclosure.

FIG. 3 is a block diagram illustrating an example of a video decoder 350, which decodes a video sequence that is encoded in the manner described herein. The received video sequence optionally comprises an encoded set of image frames, a set of frame slices, a commonly coded group of pictures (GOPs), or a wide variety of coded video units that include encoded video blocks and syntax information to define how to decode such video blocks.

The video decoder 350 represented in FIG. 3 incorporates an entropy decoding module 344 that performs the decoding function that is the reciprocal of the encoding performed by the entropy encoding module 244 of FIG. 2. In some examples, the entropy decoding module 344 converts entropy encoded video blocks in a one-dimensional serialized format back into a two-dimensional block format. The number and size of the vectors, as well as the scan order defined for the video blocks, define how the two-dimensional block is reconstructed.

As depicted in FIG. 3, the video decoder includes a filter module 349. The filter module 349 could perform in-loop or post loop filtering on reconstructed video blocks. The video decoder 350 also includes a prediction module 340, an inverse quantization unit 343, an inverse transform module 342, a memory 345, and a summer 346.

A wide variety of video compression technologies and standards perform spatial and temporal prediction to reduce or remove the redundancy inherent in input video signals. As explained above, an input video block is predicted using spatial prediction (i.e., intra prediction) and/or temporal prediction (i.e., inter prediction or motion estimation). The prediction modules described herein generally include a mode decision module (not shown) in order to choose a desirable prediction mode for a given input video block. Mode selection considers a variety of factors such as whether the block is intra or inter coded, the prediction block size and the prediction mode if intra coding is used, and the motion partition size and motion vectors used if inter coding is used. A prediction block is subtracted from the input video block, and transform and quantization are then applied on the residual video block as described above.

The quantized coefficients, along with the mode information, can be entropy encoded to form a video bitstream. The quantized coefficients also can be inverse quantized and inverse transformed to form the reconstructed residual block, which can be added back to the prediction video block (intra predicted block or motion compensated block depending on the coding mode chosen) to form the reconstructed video block. In loop or post-loop filtration methods are applicable to reduce the visual artifacts in the reconstructed video signal.

The reconstructed video block is finally stored in the reference frame buffer (i.e., memory) for use of coding of future video blocks.

In some examples, coefficients of given leaf level block of a video frame is ordered (scanned) according to a zigzag scanning technique. Such a technique is used by the encoder 250 to generate a one-dimensional ordered coefficient vector. A zig-zag scanning technique comprises beginning at an upper leftmost coefficient of the block, and proceeding to scan in a zig-zag pattern to the lower leftmost coefficient of the block.

According to a zigzag scanning technique, it is presumed that transform coefficients having a greatest energy (e.g., a greatest coefficient value) correspond to low frequency transform functions and is located towards a top-left of a block. As such, for a coefficient vector (e.g., one-dimensional coefficient vector) produced based on zigzag scanning, higher magnitude coefficients are assumed to be most likely to appear toward a start of the vector. It is also assumed that, after a coefficient vector has been quantized, most low energy coefficients will be equal to 0. In some examples, coefficient scanning is adapted during coefficient coding. For example a lower number in the scan is assigned to positions for which non-zero coefficients happen more often.

According to some examples, the encoder 250 performs an inverse zig-zag scan of transform coefficients. To perform an inverse zig-zag scan, the encoder 250 begins encoding at a location that corresponds to a last non-zero coefficient (e.g., a non-zero coefficient furthest from an upper left position of the block). Unlike the example of a zigzag scan described above, according to the example of an inverse zig-zag scan, the encoder 250 codes in a zigzag pattern from the last non-zero coefficient (i.e., in a bottom right position of the block) to an upper left position of the block. In some examples, the encoder 250 is configured to switch between a run coding mode and a level mode of coding based on a magnitude of one or more already coded coefficients.

According to an inverse zig-zag scan of transform coefficients, the encoder 250 scans a block of video data by first encoding a last_pos syntax element which indicates a last non-zero coefficient (i.e., a first non-zero coefficient of the inverse scan order). In some examples, the encoder 250 also encodes a level_ID syntax element, which indicates whether a magnitude of the last non-zero coefficient is one or greater than one. In some examples, the encoder 250 encodes the last_pos and level_ID syntax elements together as a VLC codeword.

According to a run encoding mode example, if a coefficient has a magnitude greater than zero, the encoder 250 signals a level_ID syntax element for the scanned coefficient. The level_ID syntax element could indicate whether the coefficient has magnitude of 1 or greater than 1. For example, the encoder 250 could assign level_ID a value of zero (0) if the coefficient has a magnitude equal to one (1). However, if coefficient has a value greater than one (1), the encoder 250 could assign level_ID a value of one (1). In some examples, if level_ID has a value of one, the encoder could also signal a level syntax element that indicates a magnitude of the transform coefficient.

To begin coding a block of video data using the run coding mode, the encoder 250 can first signal a last_pos syntax element, which indicates a position of a last non-zero coefficient (according to a zig-zag scan order, first coefficient of an inverse zig-zag scan order) of the scan. The encoder 250 can also signal a level_ID syntax element that indicates whether the last non-zero coefficient of the scan has a value of one (1) or greater than one, as described above. After the encoder 250 has signaled the last_pos syntax element and the level_ID syntax element associated with the last_pos syntax element, the encoder 250 can signal a run syntax element and a level_ID syntax element associated with one or more other coefficients of the scan.

The run syntax element indicates a number of coefficients with magnitude close to or equal to zero between a current (encoded) coefficient and a next non-zero coefficient in the scanning order. According to one example, the run syntax element can have a value in a range from zero to k+1, where k is a position of the current non-zero coefficient.

In some examples, to determine a VLC code word that represents run and level_ID syntax elements, the encoder 250 first determines values for the run and level_ID syntax elements, and use the determined values to determine a code number cn. The encoder 250 then uses the determined code number cn to determine the VLC code word.

In some examples, to determine the code number cn based on the determined values for the level_ID and run syntax elements, the encoder 250 uses a mapping table of a plurality of mapping tables stored in memory that defines a relationship between the level_ID and run syntax elements, and the code number cn. Such a mapping table defines, for each possible combination of values for the level_ID and run syntax elements, a code number that corresponds to each of the respective level_ID and run syntax elements. According to these examples, the encoder 250 inputs determined level_ID and run syntax element values to into a selected mapping table, to determine the code number cn.

In some examples, to code the level_ID and last_pos syntax elements, the encoder 250 determines values for the last_pos and level_ID syntax elements, and uses the determined values to determine a code number cn. The code number cn comprises an entry value that can be input into a selected VLC table of a plurality of VLC tables, to determine a VLC codeword that represents the level_ID and last_pos syntax elements. In some examples, the encoder 250 determines the code number cn based on using a mapping table of a plurality of mapping tables stored in memory, that define a relationship between the level_ID and last_pos syntax elements and the code number cn. In other examples, the encoder 250 determines the code number cn based on a structured mapping that defines the relationship between the level_ID and last_pos syntax elements and the code number cn.

As set forth in examples described above, to determine such a VLC codeword that represents level_ID and last_pos syntax elements, the encoder 250 selects a VLC table of a plurality of VLC tables stored in memory, and input the determined code number cn into the selected VLC table to determine a VLC codeword. In some examples, the encoder 250 selects the VLC table of the plurality of VLC tables based on a VLC table index value. The VLC table index value indicates which of a plurality of VLC tables the encoder 250 should use, to input the code number cn to determine the VLC codeword that represents the level_ID and last_pos syntax elements.

As described in the foregoing examples, a coder (e.g., an encoder 250, and/or a decoder 350) is configured to store a plurality of different VLC table array selection tables dedicated to characteristics of blocks of video data, such as a prediction type (e.g., intra, inter) and/or a size of a block of video data. For example, the encoder 250 stores a first VLC table array selection table dedicated to an intra prediction mode block with a size of 8×8, and a second VLC table array selection table dedicated to an intra prediction mode with a size of 16×16. The selected table array generates a VLC codeword cn is in turn used to generate a code word that can be used to code a syntax element associated with a block of video data.

One example of such tables is shown in FIG. 4. Consider a first VLC table array selection table for intra coding of transform blocks of size 8×8
    g_auiVlcTable8×8Intra[29]
and a second VLC table array selection table for intra coding of transform blocks of size 16×16 or larger
    g_auiVlcTable16×16Intra[29].
The difference between the two VLC table array selection tables is represented as a vector in FIG. 4.

According to the example of FIG. 4, each of the first and second VLC table array selection tables defines a VLC array that can be used for a plurality of different coefficient positions within the block of video data. For example, the first VLC table has a value of 8, indicating that a ninth VLC table array of a plurality of table arrays is to be used for a first coefficient of an 8×8 intra coded block. As also shown above, a next four entries in the first VLC table array selection table have a value of zero (0), indicating that a first VLC table array of a plurality of VLC table arrays is to be used to for second to fifth coefficient positions of an 8×8 intra coded block. As also shown in FIG. 4, the first VLC table array includes further entries, the values for which indicate different VLC table arrays that should be used for other coefficient positions of the 8×8 intra coded block.

Consistent with the example of FIG. 4, the first and second VLC table array selection tables each include twenty-nine (29) entries. Accordingly, to store the first and second VLC table array selection tables shown above, the coders 250, 350 each store 58 entries. In some examples, the coders 250, 350 might also store other VLC table array selection tables dedicated to different possible values of prediction type (intra, inter) and/or block size. As such, in some examples, it is undesirable for the coders 250, 350 to store a plurality of VLC table array selection tables, specifically where an amount of memory available to the coders 250, 350 is limited.

The techniques described herein are directed to reducing an amount of memory used by the coders 250, 350 to store VLC table array selection tables as described above. According to these techniques, instead of storing a first VLC table array selection table directed to a first video block characteristic (e.g., intra-coded 8×8) and a second VLC table array selection table directed to second video block characteristic (e.g., intra-coded 16×16), the encoder stores only one of the respective tables. According to these techniques, instead of storing the second VLC table array selection table as described above, the coder 250, 350 stores an indication of a difference between the first VLC table array selection table and the second VLC table array selection table as represented by the vector in FIG. 4. The coder 250, 350 uses the stored indication of the difference between the tables, to reconstruct at least a portion of the second VLC table array selection table from the first VLC table array selection table. In this manner, an amount of memory used to store the first and second VLC table array selection tables (as well as other VLC table array selection tables) can be advantageously reduced in comparison to other techniques.

Referring again to the example of FIG. 4, only a single entry (a last entry) of the second VLC table array selection table is different than the first VLC table array selection table. According to the techniques described herein, the coder 250, 350 stores an indication of the alternate value of the last entry of the second VLC table and/or a difference between the last entry of the first VLC table array selection table and the last entry of the second VLC table, for instance the vector of FIG. 4. The coder 250, 350 uses the stored first VLC table array selection table to reconstruct the second VLC table selection table, based on such an indication. In other examples, the same technique applies when more than one entry differs between the two VLC table array selection tables.

In some examples, such an indication of a difference between the first VLC table array selection table and the second VLC table array selection table described above includes an indication of a position of one or more differences between the respective tables, as well as a value indicative of the difference. For example, according to the first and second VLC table array selection tables described above, the coder 250, 350 stores an indication that position 27 of the second VLC table array selection table is different than position 27 of the first VLC table array selection table. The coder 250, 350 also stores an indication of a magnitude of the difference. For example, the coder 250, 350 stores an indication that the value of the 28th entry (position 27) in the second VLC table array selection table has a value of two (2). According to another example, the coder 250, 350 stores an indication of a difference between the 28th entries in the respective tables. The second table can then be mathematically reconstructed from the first. For example, in FIG. 4 the coder stores an indication that a difference between the respective 29th entries is one (1+1=2).

Figure 5:
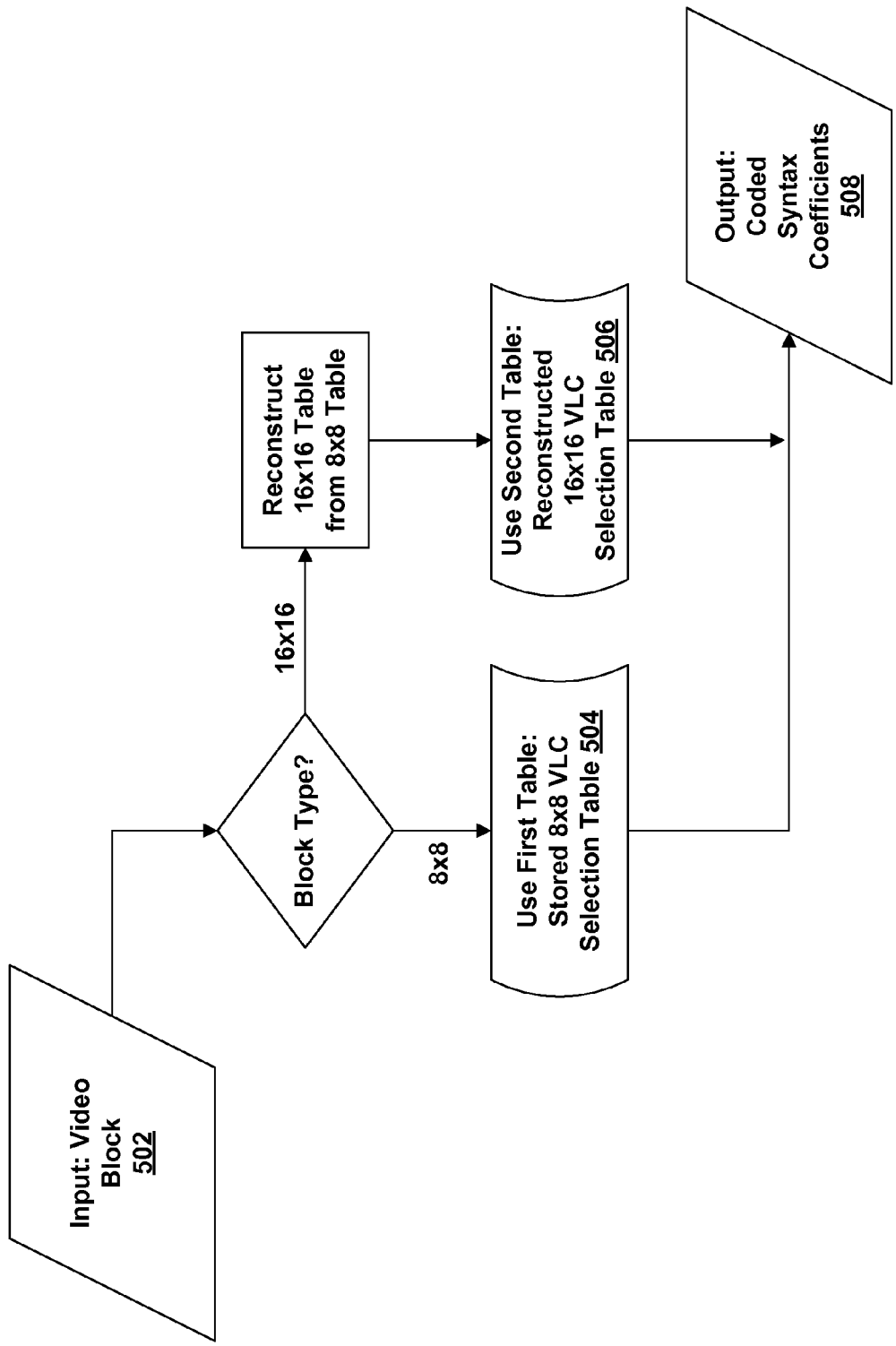
FIG. 5 is a flow diagram that illustrates an example of a video encoding and decoding method according to the techniques of this disclosure.

FIG. 5 further illustrates the method described above applied using an encoder by way of example. A block of video data 502 is input to the encoder 250 which determines the block type. If the input block 502 is an intra coded 8×8 block, the encoder uses the stored First Table 504 (g_auiVlcTable8×8Intra) to select the VLC array table. If the input block 502 is an intra coded 16×16 block, the encoder uses the Second Table 506 (g_auiVlcTable16×16Intra) reconstructed from the First Table 504 to select the VLC array table. In either instance the table array generates a VLC codeword cn is in turn used to generate a code word that can be used to code a syntax element associated with a block of video data. The coded syntax elements comprise the encoder output 508.

According to the techniques described herein, if the coder 250, 350 codes an 8×8 intra prediction mode block of video data, the coder 250, 350 uses the first VLC table array selection table described above. However, if the coder 250, 350 codes a 16×16 intra prediction mode block of data, the coder accesses the indication of a difference between the respective first VLC table array selection table and the second VLC table array selection table as described above to reconstruct the second VLC table array selection table. As also described above, the coder 250, 350 uses the reconstructed second VLC table array selection table to select a VLC table array of a plurality of VLC table arrays stored in memory, to code at least one transform coefficient of a block of video data.

Below is one example of pseudo code that is used by a decoder 350 to select a VLC table array of a plurality of VLC table arrays stored in memory, consistent with the techniques described herein. The below pseudo code is merely one example of such a technique, and is provided for exemplary purposes only. In other examples, difference pseudo code is used to implement the techniques described herein.

```
if (intra){
    vlc = g_auiVlcTable8×8Intra;
    if (blsize==8 || (blsize>=16&& k<=27)) {
        xWriteVlc( vlc, cn );
    }
    else if (blsize>=16&& k==28)) {
        xWriteVlc( 2, cn );
    }
}
```

According to the above pseudo code, the coder 250, 350 first determines a prediction type of a block of video data. As shown above, if the prediction type is an intra prediction type, the coder 250, 350 selects a VLC table array selection table g_auiVlcTable8×8Intra, which is directed to an intra-predicted 8×8 block of video data. The coder 250, 350 also determines a size of a block of video data being coded, and a position of a current coefficient of the block. The coder 250, 350 further compares the size of the block and the coefficient position to at least one value. For example, as shown in the pseudo code above, the coder 250, 350 determines whether the size of the block of video data is equal to 8 (i.e., a 4×4 block size), or greater than or equal to 16 with a position less than or equal to 27. If either of these conditions is true, the coder 250, 350 uses the previously identified g_auiVlcTable8×8Intra VLC table selection table to determine a VLC table array. The coder 250, 350 further selects a VLC table of the determined VLC table array, and input the code number cn into the selected VLC table (in the case of an encoder 250, a decoder 350 enters a VLC codeword to determine a code number cn).

As also shown in the example pseudo code above, if the above described conditions are not true, the coder 250, 350 determines whether the size of the block of video data is greater than or equal to a block size of 16×16, and whether the position k is equal to 28. If both of these conditions are true, the coder 250, 350 uses the value 2 at the 29th entry (position 28) to select a VLC table array, instead of selecting the VLC table array based on the table g_auiVlcTable8×8Intra.

Accordingly, the coder 250, 350 reconstructs the second VLC table array selection table g_auiVlcTable16×16Intra, from the stored first VLC table array selection table, based on the stored indication of a difference between the respective tables (i.e., the value 2). In this manner, the second VLC table array selection table g_auiVlcTable16×16Intra need not be stored by the coder 250, 350, thereby reducing an amount of memory used by the coder 250, 350 to code blocks of video data.

In one or more examples, the functions described herein are implemented at least partially in hardware, such as specific hardware components or a processor. More generally, the techniques are implemented in hardware, processors, software, firmware, or any combination thereof. If implemented in software, the functions are stored on or transmitted over as one or more instructions or code on a computer-readable medium and executed by a hardware-based processing unit. Computer-readable media can include computer-readable storage media, which corresponds to a tangible medium such as data storage media, or communication media including any medium that facilitates transfer of a computer program from one place to another, e.g., according to a communication protocol. In this manner, computer-readable media generally correspond to (1) tangible computer-readable storage media which is non-transitory or (2) a communication medium such as a signal or carrier wave. Data storage media is potentially any available media that can be accessed by one or more computers or one or more processors to retrieve instructions, code and/or data structures for implementation of the techniques described in this disclosure. A computer program product optionally includes a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions can be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein can refer to any of the foregoing structure or any other structure suitable for implementation of the techniques described herein. In addition, in some aspects, the functionality described herein is provided within dedicated hardware and/or software modules configured for encoding and decoding, or incorporated in a combined codec. Also, the techniques could be fully implemented in one or more circuits or logic elements.

The techniques of this disclosure can potentially be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units can be combined in a codec hardware unit or provided by a collection of interoperative hardware units, including one or more processors as described above, in conjunction with suitable software and/or firmware.

Various examples been described. These and other examples are within the scope of the following claims.

The invention claimed is:

1. A method of variable-length coding (VLC) a block of video data, comprising:
   storing a first VLC table array selection table in memory;
   storing an indication of differences between the first VLC table array selection table and a second VLC table array selection table, wherein the indication comprises a set of values that define differences between entries in the first VLC table array selection table and the corresponding entries in the second VLC table array selection table;
   reconstructing a plurality of entries of the second VLC table array selection table by arithmetically combining the entries in the first VLC table array selection table and the values of the stored indication of the differences between the first VLC table array selection table and the second VLC table array selection table; and
   using the reconstructed at least one entry of the second VLC table array selection table to code at least one block of video data.

2. The method of claim 1, wherein using the reconstructed at least one entry of the second VLC table array selection table to code the at least one block of video data comprises using the reconstructed at least one entry to select an array of VLC tables of a plurality of arrays of VLC tables to code at least one syntax element associated with the at least one block of video data.

3. The method of claim 1, wherein storing the indication of the differences between the first VLC table array selection table and a second VLC table array selection table comprises storing a value of the at least one entry in the second VLC table array selection table that is different than a corresponding entry in the first VLC table array selection table.

4. The method of claim 3, wherein reconstructing the at least one entry of the second VLC table array selection table comprises replacing the corresponding entry in the first VLC table array selection table with the at least one entry of the second VLC table array selection table.

5. The method of claim 1, wherein storing the indication of the differences between the first VLC table array selection table and a second VLC table array selection table comprises storing a value of differences between the entries in the second VLC table array selection table and corresponding entries in the first VLC table array selection table.

6. The method of claim 5, wherein reconstructing the second VLC table array selection table comprises adding or subtracting the value of the differences from the corresponding entries in the first VLC table array selection table.

7. The method of claim 1, wherein the method is performed by a processor of a computing device.

8. The method of claim 1, wherein the method is performed by a video encoder.

9. The method of claim 1, wherein the method is performed by a video decoder.

10. A device configured to variable-length code (VLC) at least one block of video data, comprising:
a processor configured to:
store a first VLC table array selection table in memory;
store an indication of differences between the first VLC table array selection table and a second VLC table array selection table, wherein the indication comprises a set of values that define differences between entries in the first VLC table array selection table and the corresponding entries in the second VLC table array selection table;
reconstruct a plurality of entries of the second VLC table array selection table by arithmetically combining the entries in the first VLC table array selection table and the values of the stored indication of the differences between the first VLC table array selection table and the second VLC table array selection table; and
use the reconstructed at least one entry of the second VLC table array selection table to code at least one block of video data.

11. The device of claim 10, wherein using the reconstructed at least one entry of the second VLC table array selection table to code the at least one block of video data comprises using the reconstructed at least one entry to select an array of VLC tables of a plurality of arrays of VLC tables to code at least one syntax element associated with the at least one block of video data.

12. The device of claim 10, wherein storing the indication of the differences between the first VLC table array selection table and a second VLC table array selection table comprises storing a value of the at least one entry in the second VLC table array selection table that is different than a corresponding entry in the first VLC table array selection table.

13. The device of claim 12, wherein reconstructing the at least one entry of the second VLC table array selection table comprises replacing the corresponding entry in the first VLC table array selection table with the at least one entry of the second VLC table array selection table.

14. The device of claim 10, wherein storing the indication of the differences between the first VLC table array selection table and a second VLC table array selection table comprises storing a value of differences between the entries in the second VLC table array selection table and corresponding entries in the first VLC table array selection table.

15. The device of claim 14, wherein reconstructing the second VLC table array selection table comprises adding or subtracting the value of the differences from the corresponding entries in the first VLC table array selection table.

16. The device of claim 10, wherein the processor comprises a video encoder.

17. The device of claim 10, wherein the processor comprises a video decoder.

18. A non-transitory computer-readable storage medium that stores instructions configured to cause a computing device to:
store a first VLC table array selection table in memory;
store an indication of differences between the first VLC table array selection table and a second VLC table array selection table, wherein the indication comprises a set of values that define differences between entries in the first VLC table array selection table and the corresponding entries in the second VLC table array selection table;
reconstruct a plurality of entries of the second VLC table array selection table by arithmetically combining the entries in the first VLC table array selection table and the values of the stored indication of the differences between the first VLC table array selection table and the second VLC table array selection table; and
use the reconstructed at least one entry of the second VLC table array selection table to code at least one block of video data.

19. A device configured to code at least one block of video data, comprising:
means for storing a first VLC table array selection table in memory;
means for storing an indication of differences between the first VLC table array selection table and a second VLC table array selection table, wherein the indication comprises a set of values that define differences between entries in the first VLC table array selection table and the corresponding entries in the second VLC table array selection table;
means for reconstructing a plurality of entries of the second VLC table array selection table by arithmetically combining the entries in the first VLC table array selection table and the values of the stored indication of the differences between the first VLC table array selection table and the second VLC table array selection table; and
means for using the reconstructed at least one entry of the second VLC table array selection table to code at least one block of video data.

* * * * *